United States Patent Office.

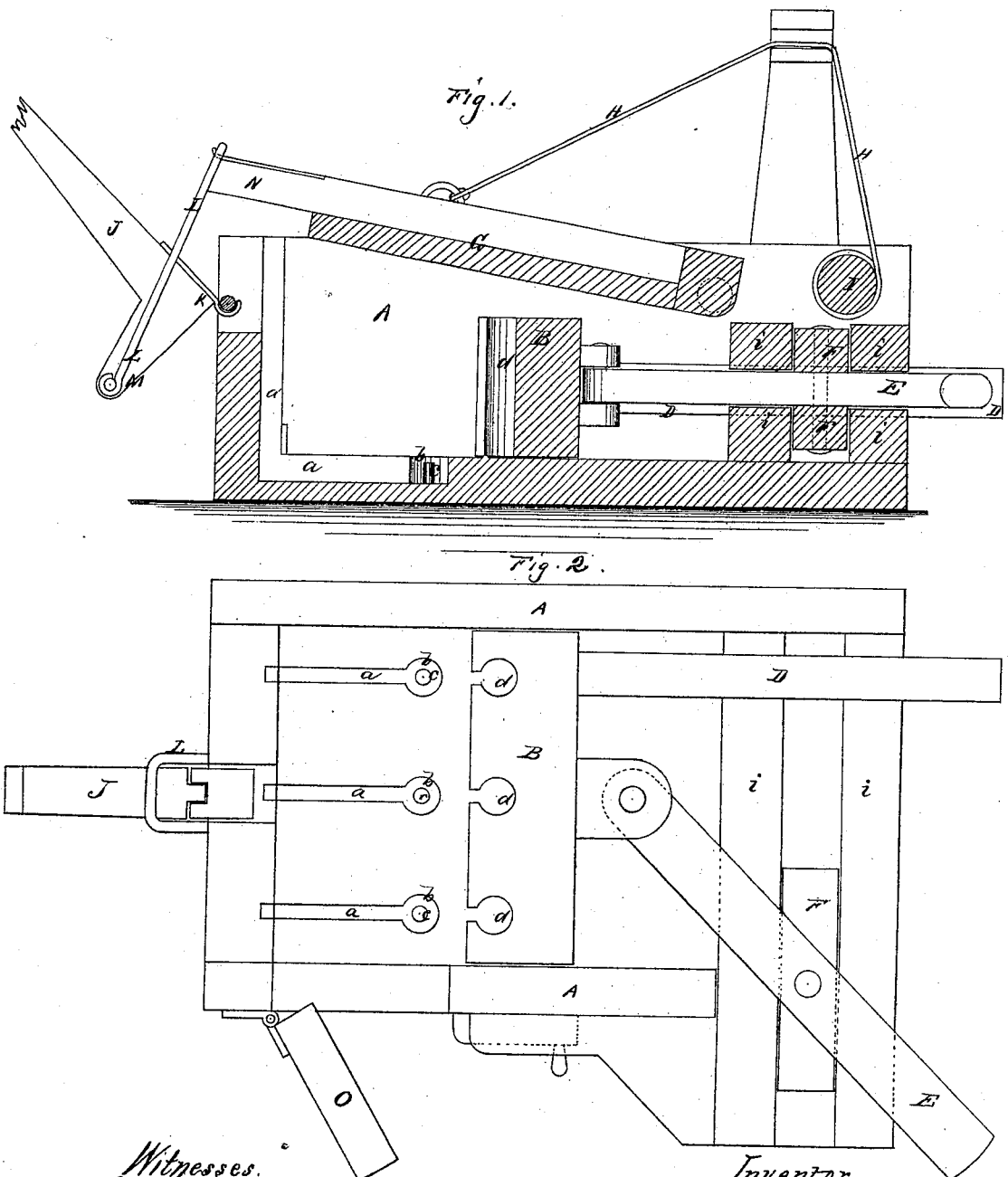

MOSES V. NORTHRUP, OF HORNITOS, CALIFORNIA.

Letters Patent No. 110,585, dated December 27, 1870.

IMPROVEMENT IN HAY AND OTHER PRESSES.

The Schedule referred to in these Letters Patent and making part of the same.

*To all whom it may concern:*

Be it known that I, MOSES V. NORTHRUP, of Hornitos, county of Mariposa, State of California, have invented an Improvement in Hay and other Presses; and I do hereby declare the following description and accompanying drawing are sufficient to enable any person skilled in the art or science to which it most nearly appertains to make and use my said invention or improvements without further invention or experiment.

The object of my invention is to provide an improvement in that class of presses which is employed to pack hay for transportation and sale, and the device may also be employed for wool or cotton.

It consists of a strong frame or box lying on the ground, so as to occupy but little space in height. A follower is arranged to move forward and backward within this box.

After the cords are laid and the box filled with hay, a door at the top is closed and drawn down tightly by a peculiar elbow-lever.

The follower is moved by a long lever operating in a horizontal plane, one end being pinned to the follower, while the fulcrum is on a block or guide a short distance from this end.

The guide moves in ways at right angles with the movement of the follower, so that as the lever is moved around it carries the guide across the line of travel of the follower till the other end of the lever, the block, and the follower are in a line with the plane in which the follower travels, and the follower is thus driven in so as to press the bale completely.

The bale is then tied and rolled out by a side door, the lever returned to its former position, and the press again filled.

Referring to the accompanying drawing, forming part of this specification—

A is the box or press, made strong to sustain the pressure.

A follower, B, moves in the direction of the greatest length of the box, which lies on its side on the ground, so as to be low, and thus reduce the labor of pitching hay into it.

The bottom of the box has channels $a$ and enlarged spaces $b$ at a point just outside of the space occupied by the bale after it is pressed.

Short pins $c$ are placed in the depressions $b$, and the tying-cords or wires are looped around the pins and carried along the channels $a$, and up the end of the box in similar channels, so that the ends hang outside the press.

The timber which forms the face of the follower has large slotted openings $d$ made through its entire depth, and after the bale is pressed, these openings stand over the pins $c$, so that the operator can reach down and draw the looped ends of the tying-strings up, when the outer ends may be brought over and the bale tied on top.

From the face of the follower a guiding-arm, D, extends back and slides against the side of the press, so as to keep the follower straight as it moves forward and back.

The long operating-lever E has its inner end pinned to the center of the follower, while at a distance from this point sufficient to move the follower as far as necessary, a block or two guides, F, are secured by a strong pin.

These guides move in ways $i$, as shown, transversely to the movement of the follower.

The team or motive-power is attached to the outer end of the lever E, and the lever, when the press is empty, stands at right angles with the line of travel in which the follower moves.

A door, G, is hinged to open the top of the press, so that it may be filled.

A rope, H, passing over the windlass I serves to open this door.

The press being filled, this door is shut as far as possible, but will not be close. To shut it closely, I employ an elbow-lever J.

The angle K is hinged to the press, as shown, and a link, L, extends up from the end M of the short arm of the lever.

This link is hooked over the extending-beam N on the door G, and the end of the lever J is brought down, thus shutting the door closely, and, at the same time, pressing the hay somewhat from the side.

The team, being then started, will move the lever E in an arc over a quarter of a circle.

This movement carries the guides along their ways till they stand directly across the path of the follower, which is, by their movement, driven straight forward, thus compressing the bale as much as desired.

The door G is then opened, and the bale tied, as before described, after which the lever E and the follower are returned to their former positions. A side door, O, is then opened and the bale rolled out.

By this construction I am enabled to make my presses much cheaper than other forms. It also relieves the labor of filling the press with hay, as it is very low.

The power brought to bear on the bale is very great, and the whole device is convenient.

Having thus described my invention,
What I claim, and desire to secure by Letters Patent, is—

The combination of the follower B, provided with large openings $d$ in rear of the rope-grooves with the corresponding depressions $b$ and pin $c$ at the end of the rope-groove $a$, the whole constructed and arranged to operate as specified.

In witness that the above-described invention is claimed by me, I have hereunto set my hand and seal.

MOSES V. NORTHRUP. [L. S.]

Witnesses:
 GEO. H. STRONG,
 W. RATLAFF BOONE.